(12) United States Patent  
Iwamura (10) Patent No.: US 8,028,097 B2
(45) Date of Patent: Sep. 27, 2011

(54) SYSTEM AND METHOD FOR SYNCHRONIZING AUDIO-VISUAL DEVICES ON A POWER LINE COMMUNICATIONS (PLC) NETWORK

(75) Inventor: Ryuichi Iwamura, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1148 days.

(21) Appl. No.: 11/078,251

(22) Filed: Mar. 10, 2005

(65) Prior Publication Data

US 2006/0072695 A1 Apr. 6, 2006

Related U.S. Application Data

(60) Provisional application No. 60/616,073, filed on Oct. 4, 2004.

(51) Int. Cl.
*G06F 15/16* (2006.01)
(52) U.S. Cl. ...................................................... 709/248
(58) Field of Classification Search .................. 709/248; 375/354, 356; 370/324, 507, 509–510, 512
See application file for complete search history.

(56) References Cited

U.S. PATENT DOCUMENTS

| 5,255,291 | A  | * | 10/1993 | Holden et al. ................ 375/362 |
| 5,440,556 | A  | * | 8/1995  | Edem et al. .................. 370/465 |
| 6,295,461 | B1 | * | 9/2001  | Palmer et al. ................ 455/557 |
| 6,587,453 | B1 | * | 7/2003  | Romans et al. .............. 370/347 |
| 6,678,740 | B1 |   | 1/2004  | Rakib et al. |
| 6,725,278 | B1 | * | 4/2004  | Gonzalez ...................... 709/248 |
| 6,778,869 | B2 |   | 8/2004  | Champion |
| 6,791,996 | B1 | * | 9/2004  | Watanabe et al. ............. 370/447 |
| 6,961,568 | B2 | * | 11/2005 | Sugaya ....................... 455/435.1 |
| 7,420,985 | B2 | * | 9/2008  | Bruckner et al. ............. 370/442 |
| 7,457,320 | B1 | * | 11/2008 | Filipovic et al. ............. 370/503 |
| 2001/0022536 | A1 | * | 9/2001 | Kallio et al. ................. 331/1 R |
| 2002/0002039 | A1 |   | 1/2002 | Qureshey et al. |
| 2002/0072326 | A1 |   | 6/2002 | Quershey et al. |
| 2002/0168174 | A1 | * | 11/2002 | Ito .................................... 386/65 |
| 2003/0038710 | A1 | * | 2/2003 | Manis et al. ............. 340/310.01 |
| 2003/0105854 | A1 |   | 6/2003 | Thorsteinsson et al. |

(Continued)

OTHER PUBLICATIONS

Shi, Y.Q. and Sun, H., "Image and Video Compression for Multimedia Engineering", CRC Press, pp. 459-461, date of publication unknown.

(Continued)

*Primary Examiner* — Faruk Hamza
*Assistant Examiner* — Jason Recek
(74) *Attorney, Agent, or Firm* — John P. O'Banion (57) ABSTRACT

A method and apparatus for synchronizing streaming media devices within a PLC network. Output synchronization errors exceeding ~30 ms become noticeable when multiple streaming media devices are outputting an audio stream. The present invention provides a system and method for isochronously sending periodic reference clocks from a master device to client devices coupled to the PLC network. The client devices set their clocks based on the reference clock. In addition the clients adjust their system clock time base in response to the average divergence of the system clock with the reference clock, or a count of the number of clocks between beacon frames. In this way the client clock is adjusted to closely track the server clock so that synchronization is maintained between each of the devices. Streaming audio shared between servers and client devices is thus output across the network with high fidelity due to the accurate synchronization.

20 Claims, 8 Drawing Sheets

U.S. PATENT DOCUMENTS

| | | |
|---|---|---|
| 2003/0174050 A1* | 9/2003 | Bienek et al. ............ 340/310.01 |
| 2004/0006484 A1* | 1/2004 | Manis et al. .................. 704/500 |
| 2004/0010729 A1* | 1/2004 | Lockridge et al. ............ 713/500 |
| 2004/0090994 A1 | 5/2004 | Lockridge et al. |
| 2004/0133704 A1 | 7/2004 | Krzyzanowski et al. |
| 2004/0136367 A1* | 7/2004 | Bridgewater et al. ......... 370/389 |
| 2004/0160990 A1* | 8/2004 | Logvinov et al. ............. 370/509 |
| 2004/0177162 A1 | 9/2004 | Wetzel et al. |
| 2004/0178683 A1* | 9/2004 | Hermetz et al. ............. 307/141 |
| 2004/0184406 A1 | 9/2004 | Iwamura |
| 2004/0208158 A1* | 10/2004 | Fellman et al. ............... 370/345 |
| 2005/0063422 A1* | 3/2005 | Lazar et al. ................... 370/532 |
| 2006/0235552 A1* | 10/2006 | Manis et al. ..................... 700/94 |
| 2008/0317070 A1* | 12/2008 | Propp et al. ................... 370/509 |

OTHER PUBLICATIONS

"MicroLink dLAN Audio Starter Kit—Audio/Ethernet", devolo AG Germany, 10 pages, Feb. 19, 2004.

* cited by examiner

SYSTEM AND METHOD FOR SYNCHRONIZING AUDIO-VISUAL DEVICES ON A POWER LINE COMMUNICATIONS (PLC) NETWORK

CROSS-REFERENCE TO RELATED APPLICATIONS

This application claims priority from U.S. provisional application Ser. No. 60/616,073 filed on Oct. 4, 2004, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to power line communication networks, and more particularly to an apparatus and method of establishing synchronization of streaming media devices communicating over a PLC network.

2. Description of Related Art

Power Line Communication (PLC) systems are being rapidly deployed in a number of consumer and business market segments in response to the convenience provided by this form of networking and aided by an increased availability of low-cost off-the-shelf PLC circuitry. PLC is a network technology in which consumer electronic devices are networked over conventional AC power connections. Recent enhancements in the available bandwidth has widened applications for PLC into streaming media (i.e. audio and video) networking arenas.

The first generation of these products were developed for Ethernet infrastructure replacement (i.e., local area networks, LANS). More recently, however, some vendors began to sell second-generation products, such as audio-streaming devices which allow conveyance of audio signals over the power lines from a source to a destination. Using the PLC network to share the audio signals is a convenient means of interfacing a plurality of streaming devices. In one example, separate audio devices can be distributed about a home or office environment wherein one device acts as the source of the audio information (e.g., CD player, MP3 player, and so forth) while the remaining devices are configured in a reception mode to receive the signal and output the audio.

However, one of the drawbacks with distributing audio over a localized area using this technique is that there is no synchronization between the audio output by a first device and by a second device. The lack of synchronization is primarily from two sources. First of all a delay is encountered as the digital signals are routed through the power lines. Secondly, each device exhibits a characteristic delay (i.e., fixed or variable) between the time the signal is received and the time an audio output is produced. In addition, the frequency of the clocks within each device can differ substantially as the clocks run independently. This lack of simultaneous output from the audio devices is termed herein as a lack synchronization between the devices.

It should be appreciated that even small synchronization differences between devices outputting audio (e.g., between a server which outputs audio and a client which outputs audio, between two clients which each output audio, or another combination of audio output devices) can begin to impact the fidelity of the resulting audio, depending on system layout, overlap, and so forth. The human hear can readily detect synchronization differences, referred to as the Haas effect, which exceed about thirty milliseconds (30 ms). The audio effect produced by the lack of synchronization, Haas effect, produces an "echo" wherein the audio sounds as if it were being played at the end of a tunnel, which can dramatically impair the overall audio experience. It should be appreciated that the synchronization problem arises for any audio outputs which are out of synchronization, such as the audio being output from nearby television sets, or from a television set and a separate audio system, which are subject to outputting the same audio stream. It should also be recognized that the problem is further exacerbated for audio being generated by surround sound systems and the like.

Accordingly, a need exists for a system and method of synchronizing the audio being communicated over a power line communication (PLC) network while overcoming the problems with device and communication path delays. These needs and others are met within the present invention, which overcomes the deficiencies of previously developed methods of assuring audio integrity.

BRIEF SUMMARY OF THE INVENTION

The invention provides an apparatus and method for synchronizing the outputs of audio devices receiving audio data from a power line communications (PLC) network between streaming media devices. According to the invention, the server (or device operating temporarily, or permanently, in the role of a server) periodically broadcasts a system time clock (STC) value to decoders within clients on the PLC. The client decoder then adjusts its own STC value based on the one received. The clock divergence is preferably determined, such as averaged over a period of time, and the frequency of the system time clock (STC) in the client adjusted to minimize divergence allowing the client to remain in synchronization with the server. The reference clock value sent from the server is broadcast isochronously so that the devices receive the clock value with minimal delay and jitter.

It has been appreciated in arriving at the present invention that synchronization mechanisms, such as utilized within MPEG streams, which provide a system clock reference (SCR) or a program clock reference (PCR), is not well suited for use in synchronizing audio and other output from devices coupled to a PLC network. A time stamping mechanism exists for use with MPEG streams, however, it cannot provide sufficient synchronization accuracy when audio is output to multiple devices over a PLC network.

It should also be appreciated that inexpensive PLC media products increment/decrement STC based on a free-running clock oscillator. In these cases once the STC starts it runs freely, wherein the STC values diverge in response to the difference in clock rates. For example, in one PLC LAN product for communicating AV streams it was found that the difference between server and client clocks reached one second after only one hour of operation.

The time stamping included within current MPEG standards provide a means for creating partial synchronization between the transmitter and receiver, for example an AV receiving unit to an AV source unit. The synchronization, however, cannot overcome dependence on buffer depth and the delays associated with communicating clock information asynchronously between the server and clients.

It should also be recognized that clock oscillators typically have accuracies of about ten parts-per-million (10 ppm), wherein synchronization can exhibit a possible cumulative error of about 36 ms per hour. According to the present invention, a system time clock (STC) works in combination with a program clock reference (PCR) or a system clock reference (SCR) which is embedded within an MPEG stream at intervals, such as at 100-700 milliseconds. The decoder in the receiver adjusts its own system time clock (STC) to the SCR or PCR when it arrives. STC then starts counting up for each received clock. To determine the divergence between clocks, every time SCR or PCR arrives the change in the STC value is compared relative to the arriving SCR or PCR values. If STC gains more than the SCR or PCR values have gained, then this indicates that the STC clock signal for the decoder is running too fast (frequency is too high), wherein it can be slowed down appropriately. If STC gains less than the SCR or PCR values have gained, then this indicates that the STC clock signal for the decoder is running too slow, wherein it is speeded-up appropriately by changing its frequency. This method works well for keeping the clock rates of the sender and receiver synchronized so that the clock errors do not accumulate which facilitates encoding and decoding activity.

The principle problems with obtaining sufficient synchronization accuracy (i.e., within 30 ms) for use with audio arises from differences in streaming device decoding circuitry and changes in communication delays inherent when communicating over the power lines. Each streaming device configured to receive a digital stream from the server has internal decoding circuits and buffers, wherein the time delay from the receipt of a frame to when that frame is output (i.e., as audio) can vary significantly from one device to the next depending on circuit implementation factors. The use of larger buffers to overcome jitter problems further increases the delay. It will be appreciated that communication delays over the PLC network can further skew synchronization. In addition, due to noise considerations, PLC communication circuits can provide significant buffering for retransmission which can further skew the output delay in response to changes in buffer occupancy.

In the present invention STC adjustment is automatically performed within each of the clients at a sufficient level of accuracy (i.e., <5 ms) to support high quality audio output. Neither SCR or PCR are used according to the invention for adjusting the STC. The invention is amenable to being embodied in a number of ways, including but not limited to the following descriptions.

One embodiment of the invention can be generally described as an apparatus for synchronizing video and audio streams being communicated over a power line communications (PLC) network, comprising: (a) a first streaming media device configured for connecting to a power line for the receipt of operating power; (b) a power line communications circuit, within the first streaming media device, configured for communicating data over the power line operating as a PLC network, between the first streaming media device and at least a second streaming media device coupled to the power line; and (c) means for isochronously communicating a reference clock from the first streaming device over the PLC network to additional streaming devices for maintaining synchronization of device output. In one embodiment the means for isochronously communicating a reference clock can comprise means for generating a periodic beacon signal over the power line communications (PLC) network; and means for communicating the reference clock during an isochronous portion of the frame defined by the beacon signal for adjusting the clock frequency of additional streaming media devices to maintain their synchronization with the first streaming media device.

Another embodiment of the invention can be described as an apparatus for synchronizing video and audio streams being communicated over a power line communications (PLC) network, comprising: (a) a first streaming media device configured for connecting to a power line for the receipt of operating power; (b) a power line communications circuit, within the first streaming media device, configured for communicating video and audio data over the power line operating as a PLC network, between the first streaming media device and at least a second streaming media device coupled to the power line; and (c) means for generating a beacon signal for communicating beacon frame boundaries to devices coupled to the PLC network; (d) means for dividing the beacon frame into a contention-free portion for isochronous transmissions and a non-contention-free portion for asynchronous transmissions; and (e) means for outputting a reference clock within the contention-free portion of the beacon frame for updating the system time clock on media devices coupled to the PLC network to maintain synchronization.

The reference clock is typically output by the first streaming media device operating in a server capacity, although any device can operate in the server mode including media devices into which server capabilities are integrated. The first media device, and the media devices communicating over the PLC network according to the invention can be generally considered to be selected from the group of media devices consisting essentially of set-top boxes, digital video recorders, media recorders/players, television sets, high-definition television sets, video monitors, audio devices, and any other device which records, plays, displays, outputs or otherwise utilizes the video and audio streaming data.

The video and audio data being communicated over the power line communications (PLC) network according to the invention comprises a digitally encoded format (i.e., MPEG) which is decoded at the receiving device. The system clock in each of the clients is adjusted to reduce absolute error as well as the difference in clock speeds as indicated by the divergence of time value from one received clock value to another.

An embodiment of the invention can also be generally described as a method of synchronizing the audio output from devices coupled to a power line communications (PLC) network, comprising: (a) generating a beacon framing signal on the PLC network; (b) communicating streaming media, including audio, between devices coupled to the PLC network; (c) reserving a portion of each beacon frame, bounded by the beacon framing signal, for use in communicating isochronous transmissions, the portion being referred to as a contention-free portion; (d) reserving a time slot within the contention-free period for communicating a reference clock;

and (e) generating a reference clock signal within the reserved time slot to update the clock on devices coupled to the PLC network for maintaining synchronization of the audio being output. The beacon signal is generated by a beacon master, which is typically generated by the server, or a device acting in the capacity of a server. The beacon signal provides a frame which is divided according to the invention into a contention-free period for isochronous transmission and a non-contention-free period (contention period) for asynchronous transmissions.

Embodiments of the present invention can provide a number of beneficial aspects which can be implemented either separately or in any desired combination without departing from the present teachings.

An aspect of the invention provides accurate synchronizing of devices communicating on a PLC network Another aspect of the invention is to provide synchronization of audio devices utilizing an audio stream communicated over the PLC network so that the Haas effect is eliminated or significantly reduced.

Another aspect of the invention is the isochronous communication of a reference clock value between a server and client device to maintain synchronization to better than about 30 ms, such as within about 5 ms.

Another aspect of the invention is to provide for adjusting the clock rates of client devices to reduce frequency divergence from the server clock frequency.

Another aspect of the invention is maintaining synchronization between a server and client(s) regardless of buffer length, occupancy, or packet arrival time.

Another aspect of the invention is to provide synchronization between clients on a PLC network which communicates streaming MPEG video and audio.

Another aspect of the invention is to provide a synchronization mechanism in which clock values are shared between a server and clients.

Another aspect of the invention is to provide a synchronization mechanism in which the period of the beacon signal (i.e., time between beacon signals) is a constant used by client devices to adjust their own system time clock frequencies.

Another aspect of the invention is to provide synchronization on both time-stamped streams (i.e., MPEG) and non time-stamped streams.

Another aspect of the invention is to provide synchronization between servers and clients, even when the server is a client operating in the capacity of a server, such as an integrated server-television set, server-set-top-box, and so forth.

Another aspect of the invention is to provide synchronization between various clients on a PLC network, including but not limited to servers, set-top boxes, digital video recorders, video recorders/players, television sets, video monitors, audio systems, PLC equipped personal audio systems, surround sound components, and so forth.

A still further aspect of the invention is that of handling clock updating with a sufficiently high priority to assure that audio output from multiple devices across the PLC network does not suffer from the Haas effect.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus and method generally shown in FIG. 1 through FIG. 8. It will be appreciated that the apparatus may vary as to configuration and as to details of the parts, and that the method may vary as to the specific steps and sequence, without departing from the basic concepts as disclosed herein.

The present invention provides mechanisms for synchronizing media being output by devices coupled to the power line communications (PLC) network. In particular, the enhanced accuracy of synchronization is particularly well suited for systems in which an audio stream shared over the PLC network is being output from multiple devices.

Figure 1:
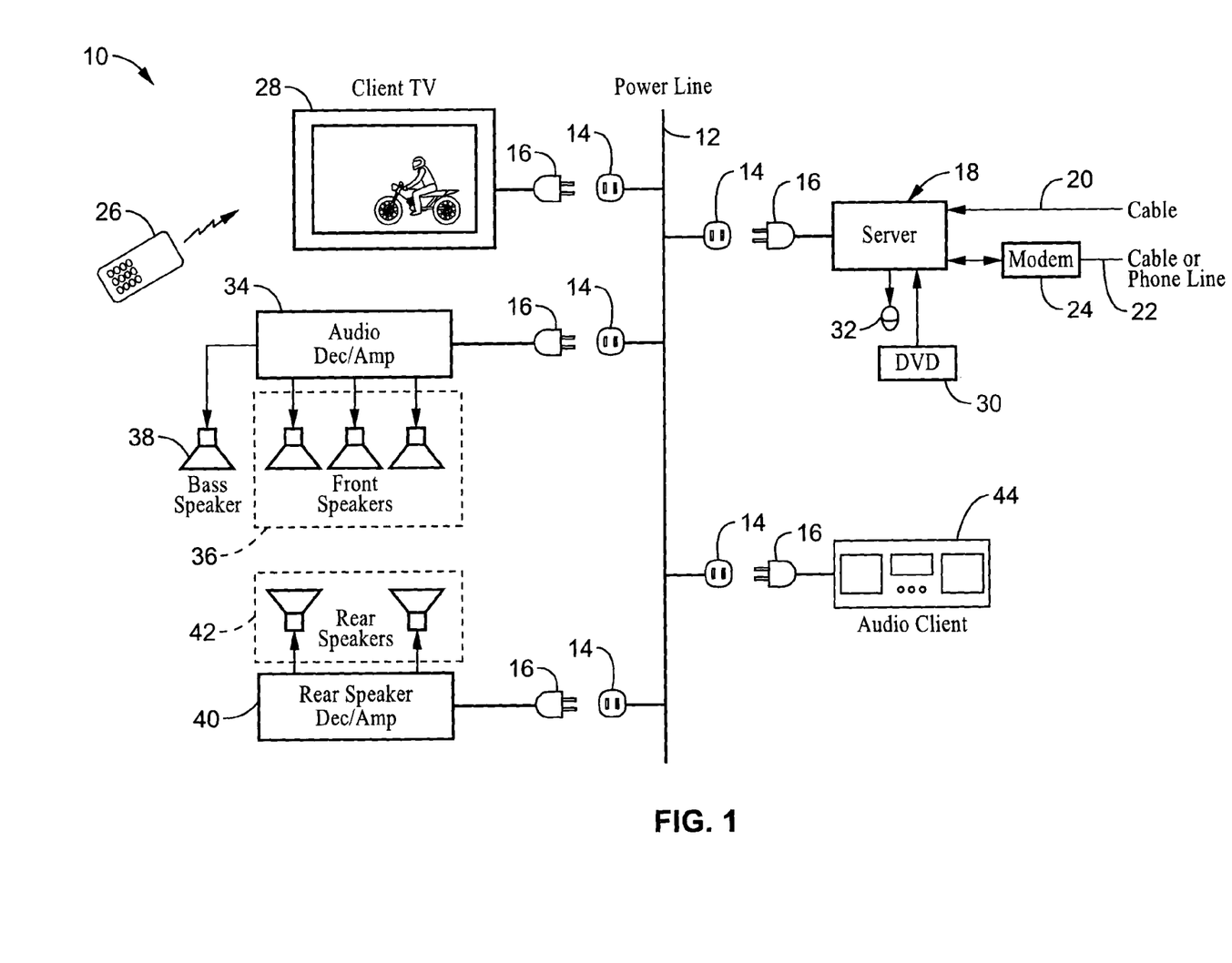
FIG. 1 is a block diagram of a PLC network according to an embodiment of the present invention, showing multiple PLC devices configured for outputting an audio stream.

FIG. 1 illustrates an example of audio-video connectivity 10 in which a power-line communications (PLC) network 12 having outlets 14 interconnects a number of audio and video devices having power plugs 16 which are coupled to outlets 14 of the PLC network. A server 18 is shown receiving signals from an outside source, such as from a cable 20 as shown and/or data 22 from the Internet via a modem 24 (e.g., cable, xDSL, telephone, satellite, and so forth). Server 18 is also shown configured for receiving external control commands, depicted as being received from a remote commander 26, whose wireless signals (e.g., infrared (IR), RF, and so forth) are received by a client television set 28 which is configured to pass certain control signals onto PLC 12 for use by server 18. It should be appreciated that server 18 may comprise a computer having AV and PLC functionality, or a device (e.g., AV player-recorder, media player, or the like) into which server functionality over the PLC network has been integrated.

Audio and/or video (AV) devices can be directly coupled to server 18 as a source for AV streams, or upon which selected AV streams are to be recorded. A DVD player 30 is shown by way of example, which can receive commands from server 18 based on infrared (IR) signals sent through an IR-mouse device 32 to the IR transceiver in DVD player 30. It will be appreciated that control signals received anywhere in PLC network 12 can be utilized by a given PLC-based device, or interpreted by server 18 which then sends commands out to the specific device.

Client television 28 is shown configured for receiving its AV stream from server 18 over PLC network 12. It should also be appreciated that television 28 can receive control signals from server 18, as well as from other control devices such as remote commander 26. Selected commands received from a remote control and/or the user interface of the device are forwarded to server 18.

A first audio decoder-amplifier device 34 is depicted which drives one or more front speakers 36 (preferably a plurality of speakers) and at least one bass speaker 38. Audio decoder-amplifier device 34 receives audio data over PLC network 12 from server 18. The received audio stream is preferably decoded to front 36 and bass 38 audio transducers (e.g., cone speakers, planar speakers, piezo speakers, horns, or similar audio output devices). A second audio decoder-amplifier 40 is configured for controlling rear speakers 42.

It should be appreciated that various audio configurations can be supported wherein multiple audio devices, or audio-video devices providing audio output, or combination can be coupled to PLC network 12 for outputting an audio stream or streams associated with selected content. By way of example an additional audio client 44 is shown by way of an inexpensive and/or portable audio device (e.g., "boom box", personal stereo, bedside alarm/audio system, whole house audio system, or the like). Audio client 44 is also preferable configured to forward select commands from a user interface and/or remote control device to server 18, and to execute commands received from server 18.

Figure 2:
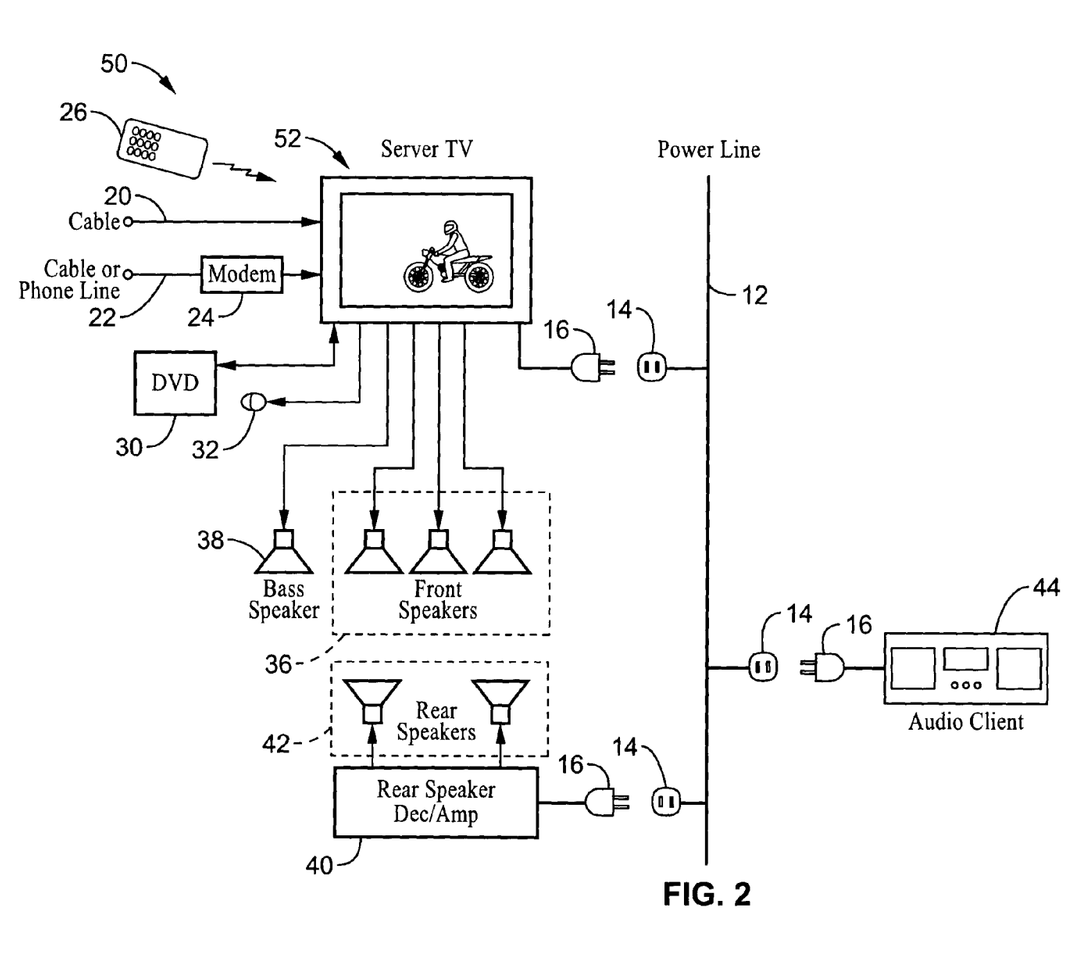
FIG. 2 is a block diagram of a PLC network according to an aspect of the present invention, showing a server integrated within a client depicted as a television set.

FIG. 2 illustrates another example of AV device communication 50 over a PLC network. In this example server 18 of FIG. 1 is integrated within a dedicated AV device, in this case television 28 of FIG. 1 to produce a television-server device 52. Television-server 52 is shown receiving source streams from cable 20 or from other sources 22 through modem 24, and it can be controlled through its user interface (not shown) or through remote control unit 26. A media player and/or recorder device 30 is shown coupled to television-server 52 and optionally receives wireless control signals, such as IR control signals through an IR mouse. Television-server 52 is also shown with an internal amplifier (or pre-amp configured for coupling to an external amplifier) which drives any number of speakers, such as front speakers 36 and base speaker 38. Other AV PLC-based devices may be connected to the PLC network for communicating AV streams and/or control signals. By way of example, an audio decoder-amplifier 40 is shown driving rear speakers 42. A portable audio client device 44 is also shown for playing audio streams received over PLC network 12.

Figure 3:
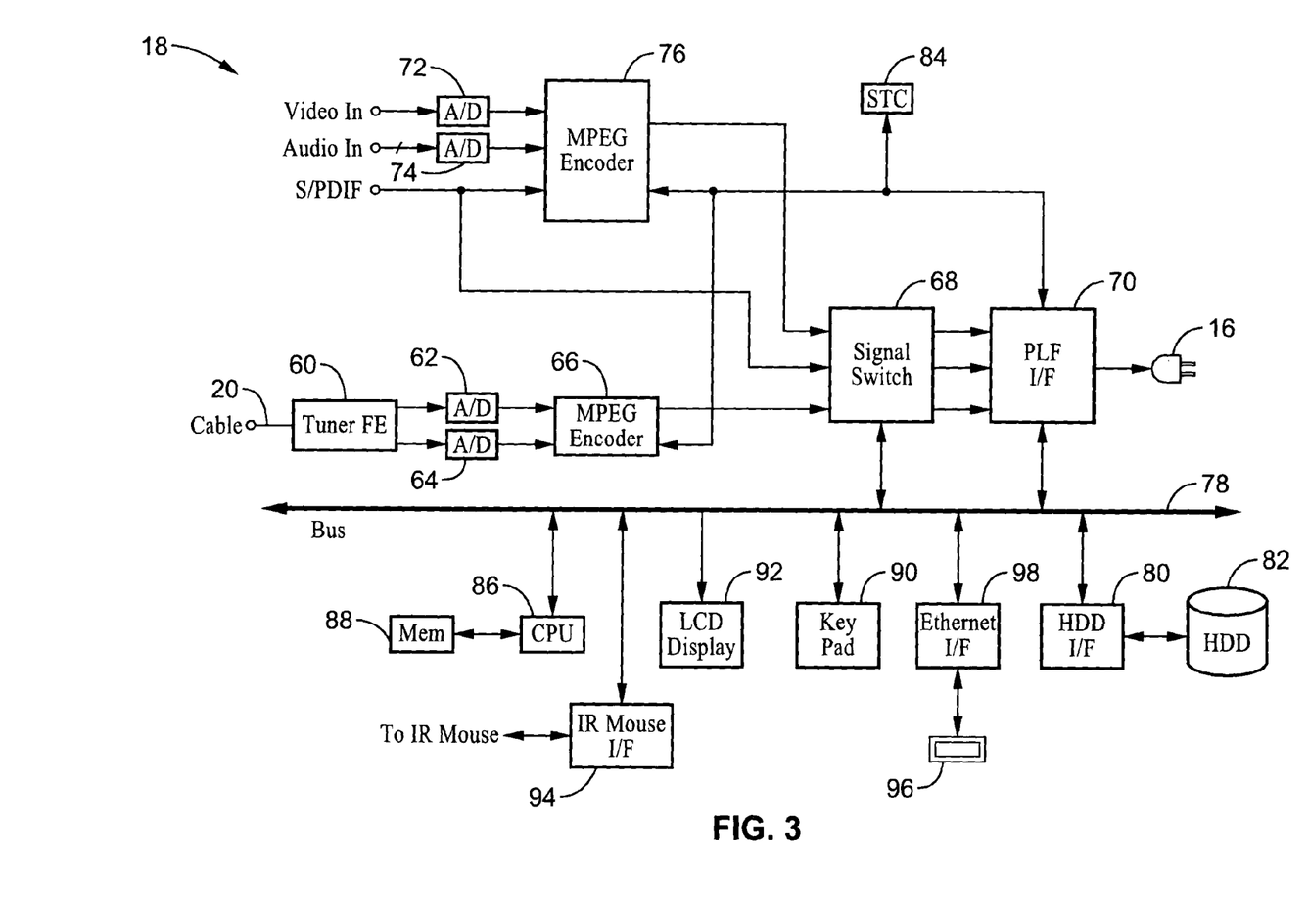
FIG. 3 is a block diagram of circuitry within the server of FIG. 1, showing MPEG encoding and AV stream communication over the PLC interface.

FIG. 3 through FIG. 6 illustrates circuitry by way of example for a number of the PLC-based devices. In FIG. 3 circuitry is depicted by way of example for server 18. A first source signal 20 is shown received at tuner/front-end 60 whose video output is converted by analog-to-digital (A/D) converter 62 and encoded such as within an MPEG encoder 66. In a similar manner, audio output from tuner/front-end 60 is converted by an (A/D) converter 64 and encoded within MPEG encoder 66. Output from MPEG encoder 66 is coupled to a signal switch 68 which controls signal switching to PLC interface 70. The PLC interface 70 performs time multiplexing of the input signals and superimposes these signals as a power-line network over the AC power being distributed by the power line.

Input from another AV stream, such as DVD player 30 (FIG. 1), are shown being converted by A/D converters 72, 74 to digital video and audio respectively, prior to receipt by a means for encoding MPEG, such as MPEG encoder 76. The output from MPEG encoder 76 is coupled to switching device 68. By way of example, an S/PDIF (Sony/Philips Digital Interface Format) is shown being supported, which provides a digital audio interconnection (e.g., PCM, compressed AC-3, or similar). When S/PDIF digital audio (IEC 60958) pass-through format is used, portions of the signal go to both MPEG encoder 76 and directly to signal switch 68.

Signal switch 68 sends a selected stream to PLC interface 70 and also forwards a stream to device bus 78 for use by other stages within the device, for example by a memory device such as a hard-disk drive (HDD) 82 controlled through an HDD interface 80. It should be appreciated that signals can be routed from signal switch 68 to HDD 82 during recording, or from HDD 82 to signal switch 68 during playback. It should be recognized that PLC I/F 70 can have two or more ports and receive plural streams simultaneously which can be multiplexed internally prior to sending on the PLC network.

A time stamping means is depicted within the server as STC 84, which communicates time to MPEG encoders 76, 66 for time stamping. The time information is also sent to each client over PLC network 12 through the PLC interface 70. Further details of time stamping are described later.

A processing means for controlling the activity and data flows over bus 78 is exemplified as central processing unit (CPU) 86 in combination with memory 88. Program firmware or software is stored in memory 88 for being executed by CPU 86. It should be appreciated that memory 88 may comprise any combination of memory forms including both solid state and media forms of data storage. A user interface is exemplified as a set of keys 90 (i.e., keypad and/or separate keys) and display 92 (e.g., LCD display, electronic ink display, LEDs, OLEDs, or other display elements or combinations thereof). It should be recognized that the complexity of the user interface depends on the application of server 18 which can be implemented according to any desired form without departing from the teachings of the present invention. In a preferred embodiment, the display is configured for displaying at least the tuning status, network status, error messages, command reception indications, and other aspects without departing from the teachings herein.

Communication between CPU 86 and other devices which are not configured for communicating over the PLC network can be provided within the present embodiment by the use of a wireless interface device, for example an infrared (IR) "mouse" 94 which can be positioned for communicating between server 18 and a remote device having an IR port. It should also be appreciated that other forms of wireless communication can be supported by the mouse concept, such as via RF, ultrasonic audio, laser, and the like.

Data may be received through a digital connection means such as Ethernet connection 96 as processed by Ethernet interface 98. The data may be received from a modem 24 as shown in FIG. 1, or similar data source, and is received by CPU 86 over bus 78. It will be appreciated that data can be received (i.e., downloaded) over Ethernet connection 96 through Ethernet interface 98, or other digital interface as processed by CPU 86 and stored in HDD 82. The data stored by CPU 86 can comprise audio and/or video streams stored on HDD 82 for later playback by a device coupled directly to server 18 (i.e., the integrated server-television of FIG. 2) or to a device coupled to the PLC network.

Figure 4:
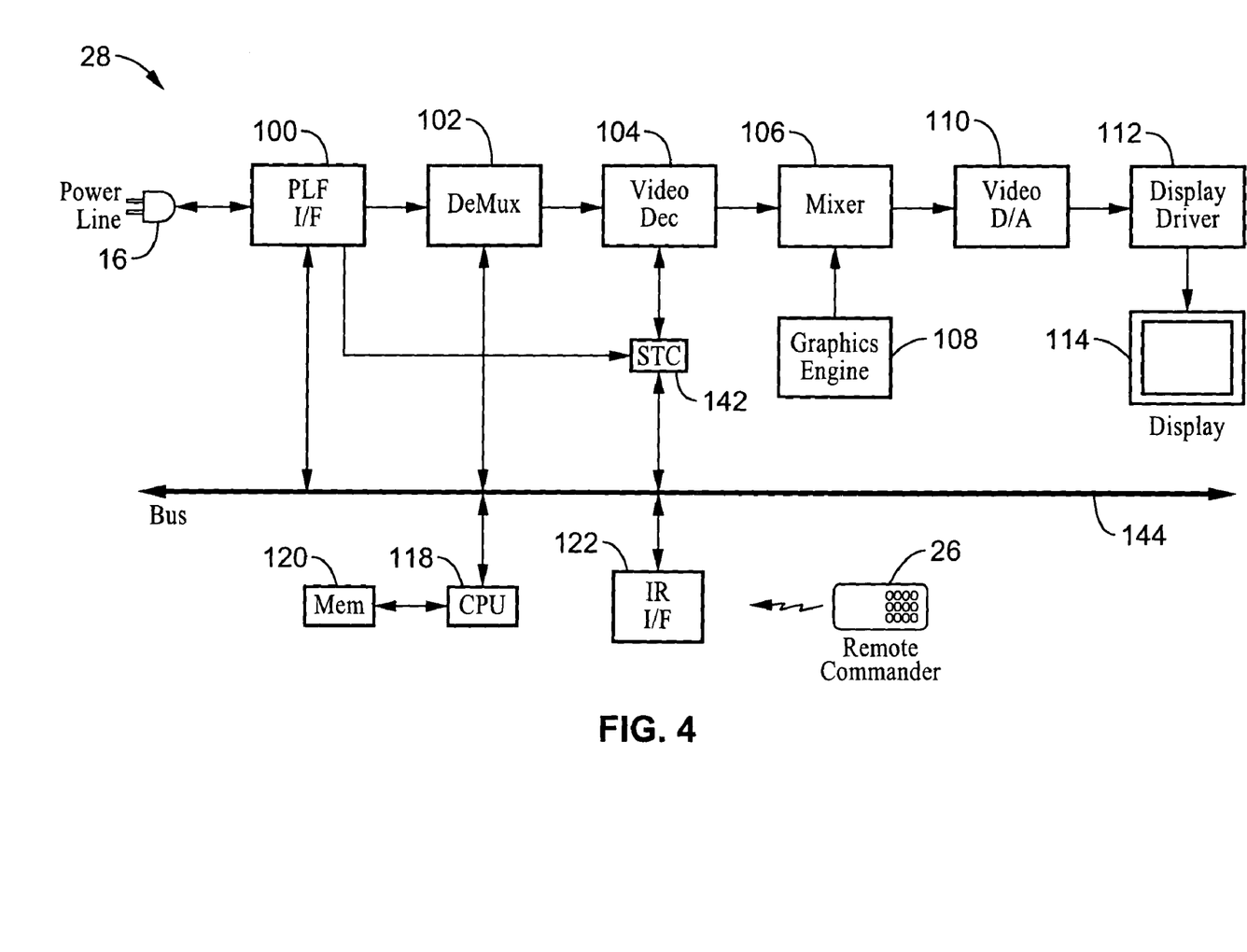
FIG. 4 is a block diagram of circuitry within the television set shown in FIG. 1, showing decoding and display of a video stream received from the server.

FIG. 4 illustrates by way of example the circuitry within a client television monitor 28. PLC interface 100 receives a signal through power line connection 16 from PLC network 12 (FIG. 2). The received signal is demultiplexed in demultiplexer 102 and passed to a video decoder 104 which is compatible with the encoding from an encoder, such as MPEG encoding and decoding. The decoded video is then mixed within mixer 106 with graphics data generated in graphics engine 108, such as on-screen source selection indications, volume, and any other elements to be displayed over the received source content. The mixed video is converted into a analog stream, such as within a video digital-to-analog converter 110 and sent to a display driver 112 for output on display 114.

A CPU 118 with memory 120 communicates over a client bus 144, with the video control aspects and optionally a wireless interface, such as infrared interface 122 for receiving commands from remote commander 26. CPU 118 can communicate with CPU 86 of server 18 (FIG. 3) over the PLC network 12 (FIG. 1). The communication between the CPUs is asynchronous as commands and data can be passed between them over the power line network. The time value sent from server 18 is sent to STC 142 where it is counted up. Video decoder 104 performs decoding of the packets based on the STC time value. CPU 118 controls operations of the elements within the client device by executing instructions stored in memory 120, which can comprise any convenient form of memory (e.g., RAM, ROM, EEPROM, FLASH, Media based memory devices, and the like).

Figure 5:
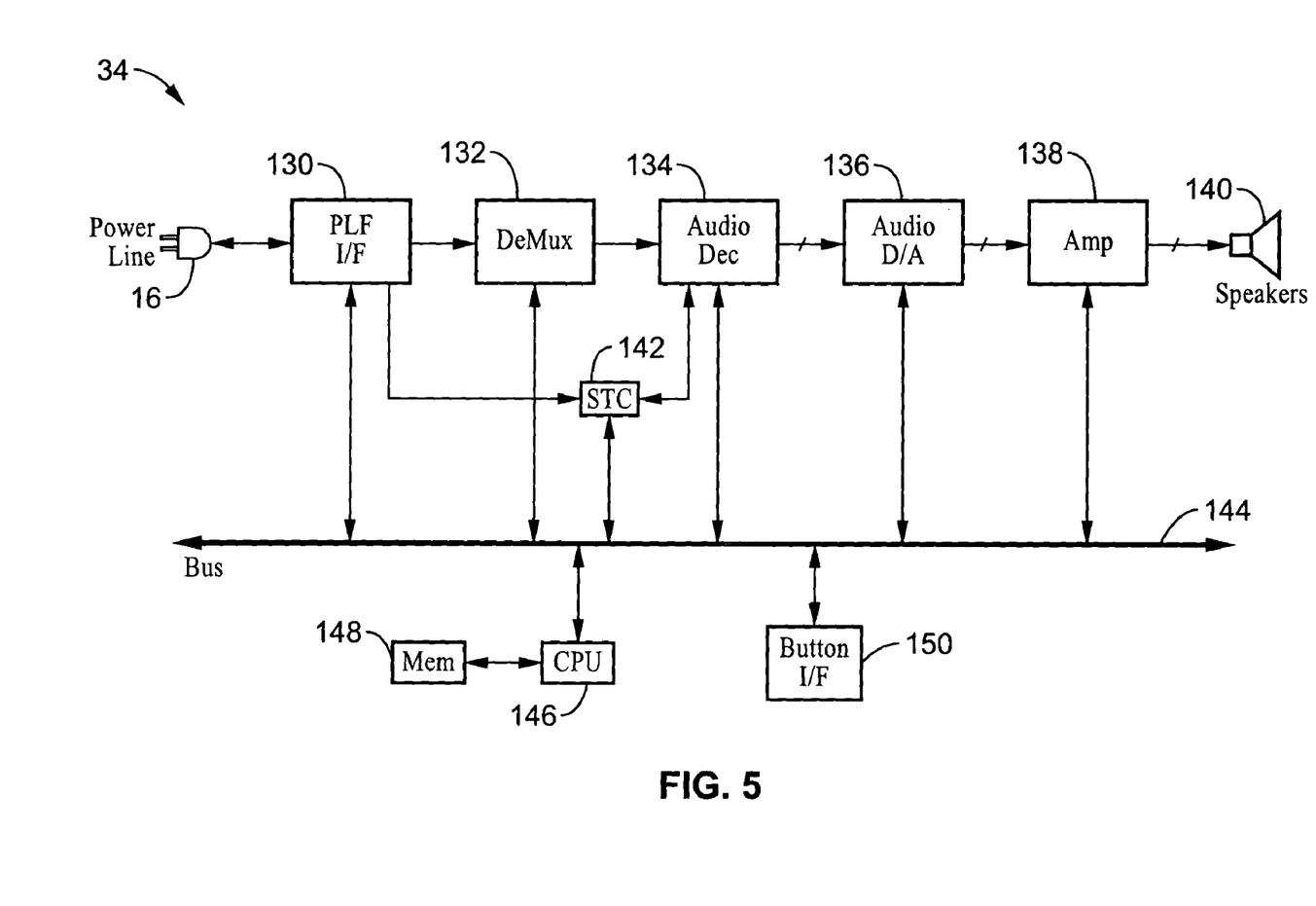
FIG. 5 is a block diagram of circuitry within the audio device shown in FIG. 1, showing decoding and audio output of an audio stream received from the server.

FIG. 5 illustrates by way of example the circuitry within a client audio decoder/amplifier device 34. A power line communications (PLC) interface 130 is configured for receiving data through power line 16 of the device. The output signal from PLC interface 130 is demultiplexed within demultiplexer 132 and decoded within audio decoder 134. Decoded audio signals are converted to analog signals within audio digital-to-analog converter 136 prior to being amplified by amplifier 138 and output over an audio transducer, such as speakers 140. It should be appreciated that the D/A conversion step is not necessary if the system is capable of outputting digital audio, such as according to Class-D amplification.

An STC circuit 142 is configured for receiving a time value from a server and counting it up. Audio decoder 134 utilizes the STC time value in decoding the packets received over the PLC network.

A CPU 146 in combination with memory 148 and bus 144 control operations within device 34 and asynchronous command and data communications with the server and optionally with other devices coupled to the PLC network. User control of the operations of the device (e.g., channel, volume, sound mode, AV source, and other control aspects) may be received through a user interface, such as a button interface 150. It should be appreciated that the interface may comprise any desired form of inputs and/or outputs, although a user interface is not necessary for implementing the device according to the invention. The user interface is shown coupled to bus 144 for communicating with CPU 146, although less preferably all or a portion of the user interface controls may be coupled directly to audio stages within the device, such as amplitude, tone and balance controls coupled to amplifier stage 138.

It should be appreciated that commands can be received from user interface 150 on this device, or from the server (i.e., server 18 in FIG. 2), or from other devices or combinations of devices coupled to the PLC network. For example, the user may send a volume control command from remote commander 26 (FIG. 4) which is received by the IR interface 122 of television monitor client 28 and communicated over the PLC network preferably intermediated by server 18, although the individual devices can be configured to communicate directly with one another.

Additional audio client devices, such as rear speaker deck amplifier 40 and "boom box" audio component 44 shown in FIG. 1 and FIG. 2, can be designed similar to the embodiment of FIG. 5.

Figure 6:
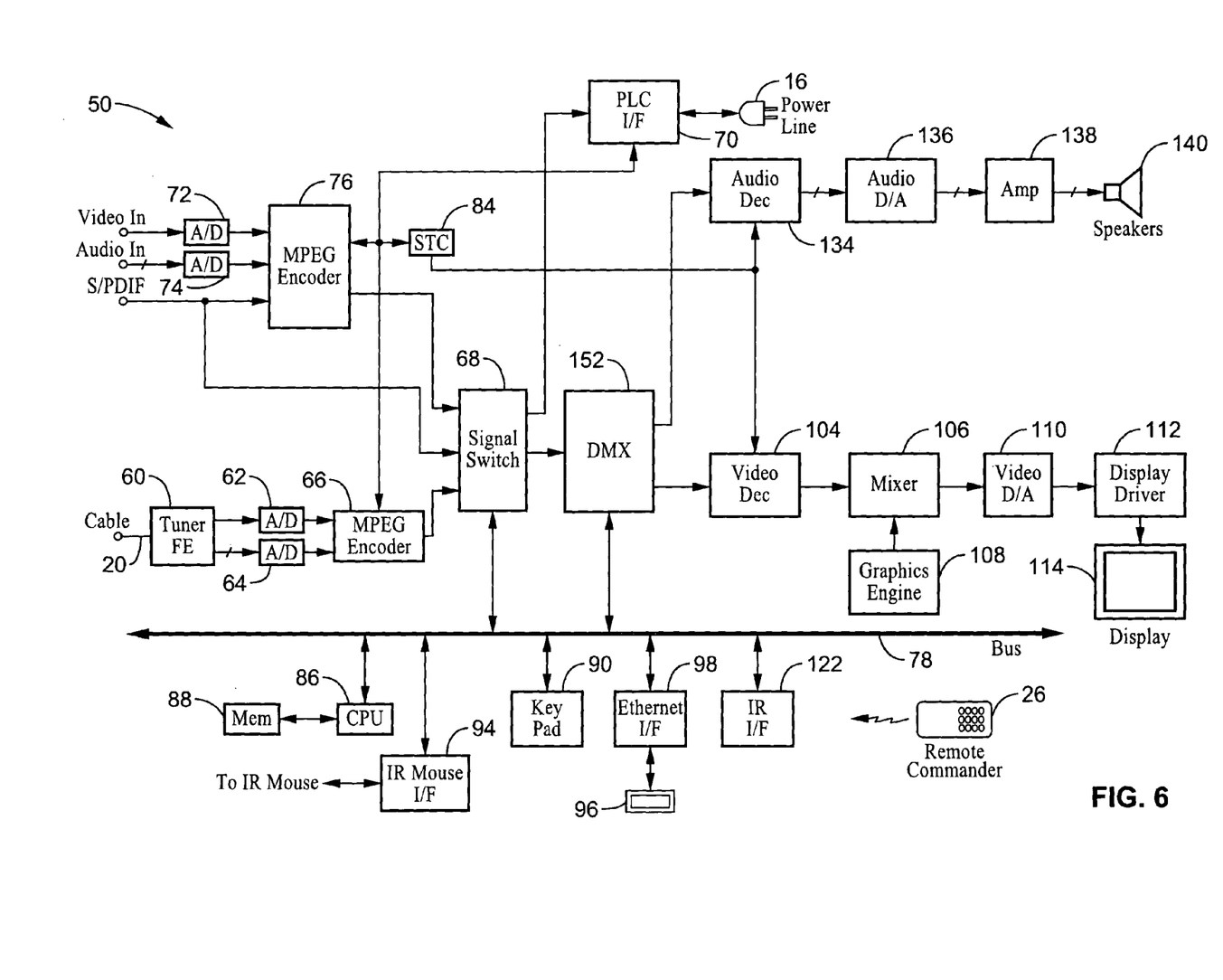
FIG. 6 is a block diagram of circuitry within the combination server-television set of FIG. 2, showing encoding and decoding functions as well as interfacing with additional clients over the PLC network.

FIG. 6 illustrates by way of example the circuitry within a combination server-television set, depicted in FIG. 2. It will be seen that the combination server-television 50 is a device that can communicate with other PLC devices, such as client audio device 40 and/or 44 shown in FIG. 2, while performing its own AV functionality. This can be extended to any combination of server-device. In addition, devices may be configured to operate "part-time" as a server while at other times deferring the server functionality to another device. Depending on the standard adopted for PLC network communication, and the mode of operation, client devices may be allowed to communicate with other clients directly, or alternatively may be required to route all such communication through the server. In FIG. 6 it is seen that the server-television 50 combines the server elements from FIG. 3 with the television elements of FIG. 4, and the audio elements of FIG. 5, while still providing the ability to serve the AV stream with other clients.

Figure 7:
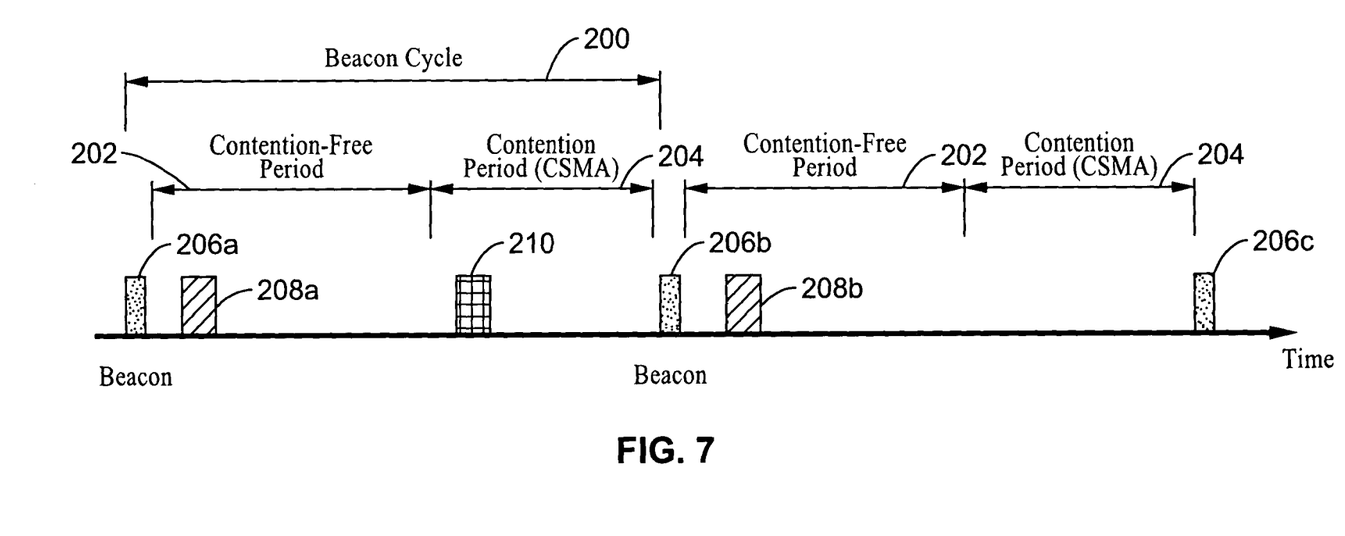
FIG. 7 is a timing diagram of isochronous communication which is performed within beacon framing according to an aspect of the present invention.

FIG. 7 illustrates by way of example bus access timing in which communication on the PLC network is divided into beacon cycles (frames) by a beacon signal 200, or similar. The beacon signal is broadcast periodically 206a, 206b, 206c, such as every ten milliseconds, or any other convenient interval. In the following description the beacon intervals are generally described as being of a fixed period, however, it should be appreciated that the period between beacons may be either fixed, variable, or semi-variable depending on the application, traffic volume, traffic composition, capabilities of the PLC devices, and mode of operation.

The beacon cycle is divided into multiple periods, in particular a contention-free period 202 and a non-contention-free period (contention interval) 204. The contention-free period supports isochronous communications between devices as a time slot may be reserved during every beacon cycle while an AV stream is being communicated. No other streams contend for the use of these time slots until they are released, thereby the name "contention-free" periods. It is recognized that the overhead involved with resolving contentions and the asynchronous nature of bandwidth availability within contentious communications prevent providing a high quality of service for streaming transmissions over the PLC network. Bandwidth is shown being reserved as a time slot 208a, 208b within successive beacon cycles. The time slot is preferably retained by the device until the stream terminates, and no other transmissions disturb or contend with the time slot until it terminates.

A reference clock is transmitted isochronously within the reserved time slots, transmissions 208a, 208b being examples. It should be appreciated that by communicating the reference clock isochronously in a reserved time slot, transmissions are never delayed by other communications. Furthermore, it should be appreciated that the reference clock is immediately available at the client for adjusting the STC and is not subject to a buffer delay. In contrast to this, the use of conventional MPEG clocks embedded within the stream are always subject to buffering of the stream at the client, wherein the delay can be sizable, such as up to one second of buffering. Another problem is that the buffer depth varies, wherein STC values set according to an embedded reference clock can not be set accurately and as a result exhibit substantial jitter (i.e., they do not monotonically increase). Therefore, it will be recognized that the apparatus and method of the present invention overcomes both the communication and buffering delays to which reference clocks are conventionally subjected, and as a result synchronization between the server and clients can be readily maintained to any desired accuracy, such as to less than 5 mS.

Conventional asynchronous communication is performed during the non-contention-free (contention) periods, wherein access is controlled according to Carrier Sense Multiple Access (CSMA) or similar first-come-first serve protocol. An asynchronous communication is shown communicating during time slot 210 within the contention period of the beacon cycle which is delineated by beacon signal 206*a*. It should be noted that the time slot is not shown being used during the subsequent beacon cycle. For the sake of simplicity, only a single isochronous and asynchronous transmission are depicted in the figure, however, it should be realized that under actual conditions any number of transmissions may be occurring, which at times may exceed available PLC network bandwidth.

Figure 8:
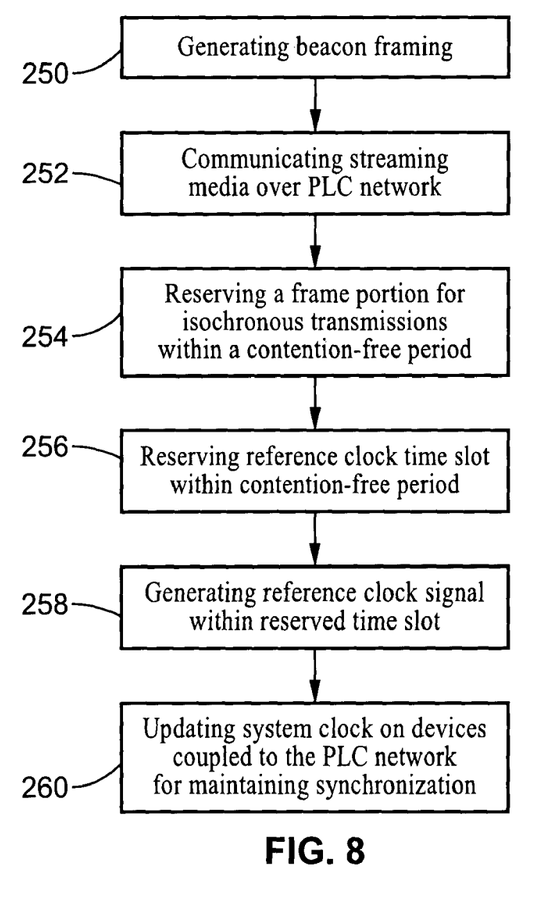
FIG. 8 is a flowchart of method steps for maintaining synchronization between devices sharing a media stream over the PLC network according to an embodiment of the present invention.

FIG. 8 illustrates by way of example the generalized flow of the synchronization process. Beacon framing is generated as represented by block 250 within which streaming media is communicated as per block 252. A portion of the beacon frames, referred to as a contention-free period, is reserved within each beacon frame for performing isochronous communication as depicted in block 254. A time slot is reserved according to block 256 for communicating the reference clock between the beacon master (i.e., typically a server) and the clients. A reference clock signal is generated within the reserved time slot, as per block 258. In block 260 the client devices update their system time clock accordingly. It should be appreciated that client devices preferably are configured to modify the frequency (i.e., time base) of their system clock to reduce clock divergence from that of the master clock. Divergence can be determined by registering the change in the absolute difference between the internal time value and that received, or by registering the number of clock cycles within each beacon frame. Accurate synchronization is thus provided to increase the fidelity of combined audio outputs by overcoming the Haas effect.

As described earlier, the decoder (e.g., MPEG decoder) commences decoding based on the system time clock (STC) which runs independently within each client and which causes delays between the clients. Each client adjusts its own STC value based on the reference clock value.

A reference clock value is obtained by the server (or client operating in a server mode) by adding a known delay time to the STC value of the server. The delay time is preferably predetermined, such as a fixed delay of one second (1 S). The fixed delay is decided based on network transmission delay and decoder buffering delay. If the fixed delay is too large, the buffer in the client will be subject to overflow, and if too low then the client buffer will be subject to underflow.

Considering an example of STC use, the server (which may be a server 18 as in FIG. 1, or a client device operating in a server mode) reserves a slot in the contention-free period for sending a reference clock signal to each client. Clients upon receiving the reference clock adjust their STC value accordingly. Typically, the reference clock value is short, such as four bytes in length according to the present embodiment, wherein the reference clock readily fits within a single time slot. Sending the reference clock within a reserved time slot within the contention-free period assures that the reference clock is being received in a timely manner as it is subject to a minimum fixed delay. If instead the reference clock were sent asynchronously then transmission could be blocked by other traffic generating unpredictable delays which would result in STC values which bounce around and thus do not increase at a constant rate.

The client receives the reference clock value and sets STC to that value and starts counting with STC from that value. For example, with regard to video decoder 104 (FIG. 4) the streaming video data arrives filling the buffer until the time indicated by the first reference clock cycle has arrived at which time decoding commences. Even when a client starts decoding after the others start, the client immediately synchronizes with the stream.

It will be appreciated that in order to provide a reliable monotonically variable (steadily changing—increasing or decreasing) STC value both the server and the client must handle the reference clock with a high priority, or more preferably the highest priority, therein eliminating any significant time perturbations of the STC value. The reference clock value is communicated to clients frequently, for example every five seconds. By way of example, the slot may be reserved for transmitting the reference clock, and then the transmitter released. Alternatively, a time reference may be transmitted in a dedicated slot within the isochronous period. It should also be appreciated that a time reference may be less preferably communicated outside of the contention-free period, for example the time reference may be communicated within the beacon period or in a dedicated time slot, in these cases the time value is still not subject to indeterminate delays caused by other transmissions. It should be appreciated that the time reference contains only a small amount of data in relation to the size of the frame, wherein periodic communication of a time value, without subjecting it to delay from other transmissions, does not significantly impact available bandwidth.

When a server encodes an analog source, the reference value is obtained from the server's STC which is free-running. In cases in which the server is receiving a digital broadcast stream (e.g., MPEG stream or similar digital packet stream) from the cable network or terrestrial antenna, STC will be locked to the system clock reference (SCR) or program clock reference (PCR) value which is embedded within that stream.

Clients frequently receive the reference clock value from the server. When the counter of STC is larger than the reference clock value, the STC clock rate will be slowed down. Similarly, when the STC clock value is smaller than the reference clock value, the clock rate will be increased to catch up. Note that transmission of a reference clock value includes some jitter. The modification of STC should be performed over a period of time in order to overcome the influence of jitter. For example, STC control can be performed by averaging the reference clock over several consecutive periods. The other clients adjust their own STCs in the same way, wherein the time differences between STC is kept low, for example within five milliseconds ($\leq 5$ ms).

According to the present invention the clients adjust their STC value based on the reference clock received in the reserved isochronous time slot and it is not adjusted in reference to the PTC/SCR value of an MPEG source. It will be immediately recognized that buffer size and packet arrival time does not affect STC accuracy according to the present invention. Some audio compression formats (e.g., MP3 and so forth) require about twenty milliseconds (20 ms) or more for decoding. In this system, however, decoding delay does not create STC time differences between clients.

Consider how audio delays arise in a conventional PLC network configured like that of FIG. 2. In this case the video monitor, audio bass, and audio front speakers are built into server 50. Because internal transmission is much faster than network transmission, sound from rear speakers 42 lags behind the front speakers 36 and bass speaker 38 in this conventional system. However, according to an embodiment of the new system no significant delays arise between server and clients as STC is sent to both the client 40 (FIG. 2) and any internal AV decoders 104, 134 (FIG. 6). It should be noted that a fixed delay is added to the reference time value, wherein internal decoders 104, 134 will start decoding at the same time as the client decoder 40.

Alternatively, instead of using a reference clock value, each client may use the duration of the received beacon to adjust the frequency of the STC time base. The server sends beacons based on its STC, wherein for an STC rate of 27 MHz and a beacon cycle of 10 ms a total of 270,000 STC pulses are transmitted by the server. Each client checks time interval every so many beacon cycles, such as every 10 beacon cycles, (100 ms). In this scenario, over a period of 10 beacon cycles 2.7M STC pulses would be nominally received. If the clock oscillator has a 10 ppm accuracy, then an error up to 27 pulses could arise. If the STC counts more than 2.7M pulses, the STC is too fast and will be slowed down. Conversely, if the STC counts less than 2.7M pulses it is too slow and will be accelerated. To remove the influence of jitter, several intervals may be averaged. Even according to this method the server should send a reference clock value at least once in order to inform each client as to the absolute time, whereafter the time base corrections keep the server and clients synchronized.

The beacon master (transmitter) may comprise a separate server, such as server 18 of FIG. 1, or it may comprise another server, combination server-client, or even a client acting at least temporarily as the beacon master. If a client is acting as the beacon master then server 18 needs to synchronize its STC with the beacon timing in the same manner as the other clients, since in this regard it is operating as a client. In the situation that server 18 is receiving a digital broadcast stream (MPEG stream) from the cable network or terrestrial antenna, STC will be locked to SCR or PCR embedded in the stream. If server 18 transmits a beacon signal based on its STC, no problems will arise. If another device is the beacon master, no beacon should be used for synchronization. Broadcast clock timing and the beacon master clock are not equal and error accumulation will result in noticeable delay.

The user may also manually adjust STC in each client, such as using remote commander 26 as depicted in FIG. 1. Server 18 receives signals from the remote commander through client 28 which adds or subtracts an offset value to or from the STC value. For example, when the STC of a client lags behind the other clients, an offset is added to the STC value for the client. When the client gains, an offset is subtracted from the STC value. This offset value may be stored in a non-volatile memory (e.g., FLASH memory) so that the user does not have to perform an adjustment every time the system is used.

The system can also handle a non-time-stamped, fixed rate, stream such as S/PDIF (IEC 60958). The server sends a start command to each client a given time after the transmission starts. Each client starts decoding upon receiving the command. Fixed rate decoding is performed based on the STC clock which is frequently adjusted with a reference clock value from the server supplied via isochronously on the reserved timeslot. Therefore, no significant synchronization delays can arise between the various clients.

Many variations on the teachings of the present invention can be created by one of ordinary skill in the art without inventive efforts. By way of example and not of limitation, network time protocol (NTP) or simple network time protocol (SNTP) may be utilized to send a reference clock value.

NTP was developed to adjust the time clock in each PC on the network. A drawback of conventional NTP is that clock accuracy depends on the volume of network traffic, and can vary from 5 ms to 100 ms. However, using the isochronous communication of the present invention, the traffic delays can be overcome increasing the accuracy of this form of NTP.

It should be appreciated that although the present invention is particularly beneficial for application within a power-line communications network the method and teachings herein can be applied to other wired and even wireless networks by one of ordinary skill in the art.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for synchronizing video and audio streams being communicated over a power line communications (PLC) network, comprising:

a first streaming media device configured for connecting to a power line for the receipt of operating power;

a power line communications circuit, within said first streaming media device, configured for communicating data over said power line operating as a PLC network, between said first streaming media device and at least a second streaming media device coupled to said power line;

wherein a periodic beacon signal is sent by said power line communications circuit to establish bus access timing for the devices on the PLC network whose video and audio streams are to be synchronized;

wherein said periodic beacon signal divides the power line channel into beacon cycles divided into multiple periods comprising a contention-free period and a non-contention-free period;

wherein streaming media devices communicate isochronous data within time slots of the contention-free period, and asynchronous data within time slots of the non-contention-free period, within said beacon cycles; and means for isochronously communicating a reference clock, containing a multi-byte clock value, within a reserved time slot of said contention-free period from said first streaming media device over said PLC network to additional streaming media devices for maintaining synchronization of device output;

wherein said reference clock is available to the additional streaming media devices without a buffer delay;

said synchronization is maintained in response to adjusting a system clock in response to said reference clock, which controls timing of device output, within each of said additional streaming media devices to match the reference clock sent from said first streaming media device.

2. An apparatus as recited in claim 1, wherein said reference time clock is used to maintain a system time clock, in the additional streaming media devices, having an accuracy of approximately 5 milliseconds, or better, regardless of buffer size and packet arrival time.

3. An apparatus for synchronizing video and audio streams being communicated over a power line communications (PLC) network, comprising:

a first streaming media device configured for connecting to a power line for the receipt of operating power;

a power line communications circuit, within said first streaming media device, configured for communicating video and audio data over said power line operating as a PLC network, between said first streaming media device and at least a second streaming media device coupled to said power line;

means for generating a beacon signal for communicating boundaries of a beacon frame, which is divided into time slots within a contention-free portion for isochronous transmissions and a non-contention-free portion for asynchronous transmissions, to devices coupled to the PLC network; and means for outputting a reference clock, as a multi-byte clock value, within said contention-free portion of said beacon frame for updating the system time clock, which controls timing of device output, on media devices coupled to the PLC network to maintain synchronization.

4. An apparatus as recited in claim 3:

wherein said reference clock is output by said first streaming media device operating in a server capacity; and wherein said first streaming media device may comprise a separate media server, or media server capabilities integrated within a media device.

5. An apparatus as recited in claim 4, wherein said media device is selected from the group of media devices consisting essentially of set-top boxes, digital video recorders, media recorders/players, television sets, high-definition television sets, video monitors, and audio devices.

6. An apparatus as recited in claim 3, wherein said video and audio data is communicated over said power line communications (PLC) network in a digitally encoded format which is decoded at the receiving device.

7. An apparatus as recited in claim 6, wherein said encoding comprises encoding defined by the Motion Picture Experts Group (MPEG) standards.

8. An apparatus as recited in claim 3, wherein said means for outputting a reference time clock is configured to maintain the accuracy of the system time clock within an accuracy of approximately 5 milliseconds, or better, for said second streaming media device regardless of buffer size and packet arrival time.

9. An apparatus as recited in claim 8, wherein said reference time clock is output by said first streaming device to allow said second streaming device to update its system time clock value.

10. An apparatus as recited in claim 9, wherein said reference time clock is configured for receipt by said second streaming device which alters the frequency of its system time clock in response to a rate of divergence between the received reference clock value and the system time clock reference within said second streaming device.

11. An apparatus as recited in claim 10, wherein said divergence rate is determined over multiple periods to reduce the effects of signal jitter.

12. An apparatus as recited in claim 9, wherein said beacon framing signal is sent at a regular rate for receipt by said second streaming device which alters the frequency of its system time clock in response to a count of clock periods which occur during the beacon frame.

13. An apparatus as recited in claim 12, wherein said altering of the system time clock is determined over multiple beacon frames to reduce the effects of signal jitter.

14. An apparatus as recited in claim 3:

wherein said reference clock comprises a system time clock value of said first streaming media device which is combined with a time offset value; and wherein said time offset value is determined in response to average network delay and buffering delay.

15. An apparatus as recited in claim 3:

wherein said means for outputting a reference clock is configured to output the reference clock within a time slot which is reserved within said contention-free portion of said beacon frame; and wherein said reference clock is output approximately every five seconds or less.

16. A method of synchronizing the audio-video output from devices coupled to a power line communications (PLC) network, comprising:

generating a beacon framing signal on the PLC network;

communicating streaming media including audio, video, or a combination of audio and video between devices coupled to said PLC network;

reserving a portion of each beacon frame, bounded by said beacon framing signal, for use in communicating isochronous transmissions, said portion being referred to as a contention-free portion;

reserving a time slot within said contention-free period for communicating a reference time clock; and generating a reference time clock, as a multi-byte clock value, within said reserved time slot to update the system time clock on devices coupled to the PLC network for maintaining synchronization of the streaming media being output;

wherein said synchronization is maintained on devices coupled to the power line communications (PLC) network in response to adjusting their system time clock, which controls timing of device output, to match the reference time clock.

17. A method as recited in claim 16, wherein a server, or a device acting in the capacity of a server, generates said beacon framing signal.

18. A method as recited in claim 16, wherein said reference clock signal is generated to update the system time clock values in the devices receiving the reference clock.

19. A method as recited in claim 16, wherein said beacon frames, or said reference clock, or a combination of beacon frames and reference clock is used for adjusting the frequency of the system time clocks within the devices coupled to the PLC network.

20. A method as recited in claim 19, wherein adjusting the frequency of said system time clock in the devices in performed over a number of said beacon frames, or reference clock, to reduce the effects of signal jitter.

* * * * *